June 25, 1968 K. L. WHEELER 3,389,421
FURNITURE GLIDE
Filed May 17, 1966
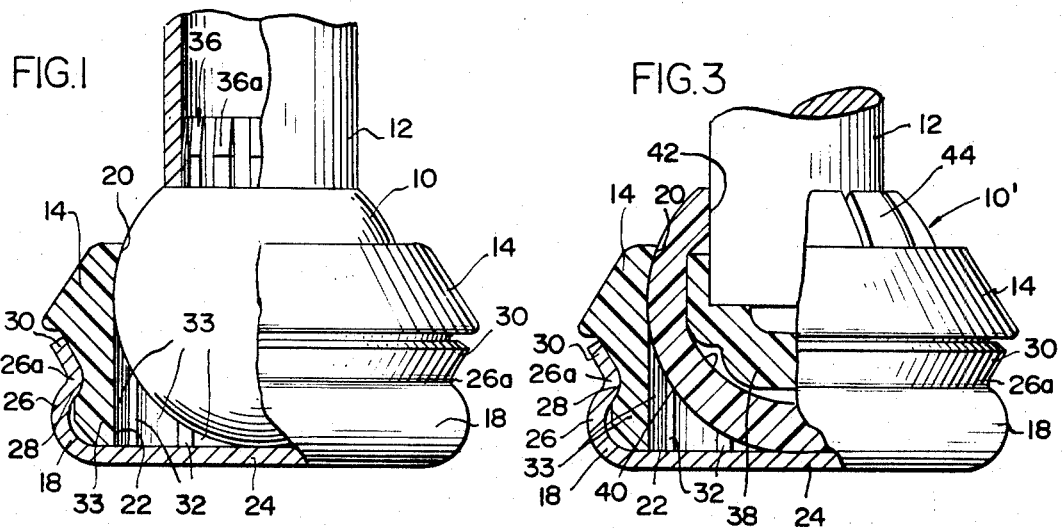
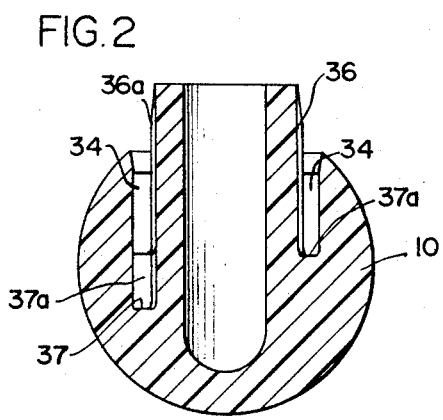
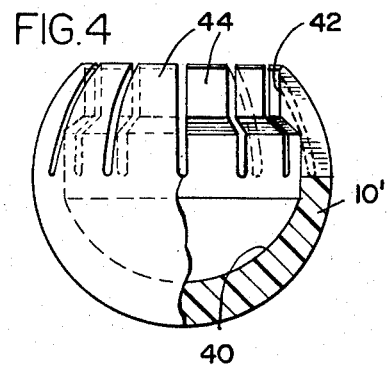
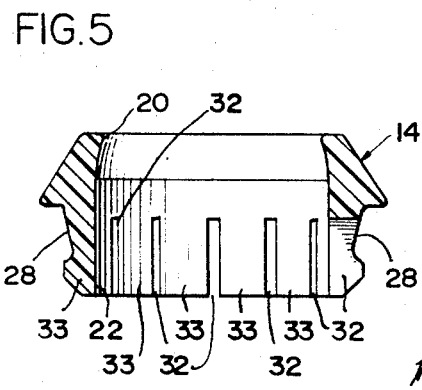
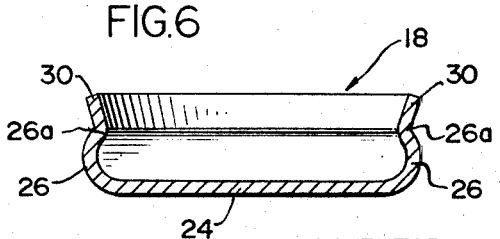
INVENTOR
KENNETH L. WHEELER
BY
ATTORNEYS 3,389,421
FURNITURE GLIDE
Kenneth L. Wheeler, Kalamazoo, Mich., assignor to Brunswick Corporation, a corporation of Delaware
Filed May 17, 1966, Ser. No. 550,723
8 Claims. (Cl. 16—42)

ABSTRACT OF THE DISCLOSURE

A furniture glide for use in connection with a leg of furniture to permit the furniture to be tilted while in contact with a supporting surface. The glide includes a ball member adapted to be secured to the end of the furniture leg and received in a socket member permitting universal movement. A floor engaging shoe member is secured solely about the bottom of the socket member and the socket member has a bottom opening located to permit the ball to rest on the central portion of the shoe member so that thrust from the furniture is transmitted directly to the shoe. The socket member has resilient fingers which permit the shoe member to be snap fitted into the socket. In one form of the invention, the ball member has an interior cavity for receiving a slightly enlarged portion at the end of the furniture leg with the ball member having resilient fingers about the mouth to permit the enlarged leg end to snap fit into the cavity. In another form of the invention, the ball has an annular groove extending into the interior thereof for wedgingly receiving a tubular furniture leg, the annular groove forming a central shank portion which extends into the tubular leg.

---

This invention relates particularly to a glide for furniture comprising a ball member adapted to be secured to a furniture leg end, a socket member embracing the ball member for universal movement, and a floor engaging shoe member about the socket member, all of said members being snap-fitted together to facilitate a simple and economical assembling operation, the assembly then being snap-fitted onto the furniture leg end to facilitate a simple and economical installation operation.

The primary object of this invention is to provide an improved furniture glide and attaching means, of simple and economical construction to reduce its cost and to facilitate manufacturing the glide and installing it onto a furniture leg.

It is a further object of this invention to provide a furniture glide which permits an article of furniture to be tilted while in contact with the supporting surface.

Another object is to provide a furniture glide which is completely assembled by simply snap-fitting a plurality of members together without requiring glue, screws, or other such fastening means to retain them in place.

It is still a further object to provide a furniture glide that is particularly adapted for installation on a tubular furniture leg end.

Yet another object of this invention is to provide a furniture glide of the character described wherein the thrust from the furniture leg is transmitted directly to the shoe member thereby eliminating much of the wear between the ball and socket members.

Other objects and advantages of the invention will become apparent from the subsequent description taken in conjunction with the accompanying drawing, in which:

FIGURE 1 is a partial cross sectional view on an enlarged scale of one form of the furniture glide embodying the invention;

FIGURE 2 is a central sectional view through the ball member of the furniture glide of FIGURE 1;

FIGURE 3 is a partial cross sectional view of an alternate form of a furniture glide embodying the invention;

FIGURE 4 is a partial sectional view of the ball member of the furniture glide of FIGURE 3;

FIGURE 5 is a central cross sectional view of the socket member of both forms of the glide shown in FIGURES 1 and 2; and FIGURE 6 is a central cross sectional view of the floor engaging shoe member of both forms of the glide shown in FIGURES 1 and 2.

The furniture glide of the present invention is comprised of a plurality of interchangeable parts snap-fitted together and the assembly is snap-fitted onto a furniture leg end thereby eliminating glue, screws, or other such fastening means to retain the parts in place and retain the assembly on the furniture leg end.

Referring to the form of the invention shown in FIGURE 1, the furniture glide is generally comprised of a ball member 10 adapted to be secured to a tubular leg end 12, a socket member 14 embracing the ball member for universal movement to permit tilting of the furniture leg with respect to the socket member, and a floor engaging shoe member 18 secured solely about the bottom of the socket member. The ball member 10 and socket member 14 are preferably molded of plastic materials which provide durable and inexpensive parts, while maintaining a clean and decorative appearance for the furniture glide. The shoe member 18 is preferably formed of metal to provide for long life of the floor engaging portion of the glide.

The socket member 14 (FIGURE 5) is preferably molded as a ring member having a cylindrical cavity which has an upper mouth 20 and a bottom opening 22. The ball member 10 is embraced by the ring-like socket member for universal movement to permit tilting of the furniture leg with respect to the socket member. The mouth 20 of the socket is slightly smaller than the diameter of the ball member 10 to retain the ball member within the socket. The bottom opening 22 is located to permit the ball member 10 to rest on the central portion of the shoe member 18 in the assembled glide so that thrust from the furniture leg is transmitted directly to the shoe. Since the shoe is made of metal and since the shoe absorbs the thrust from the furniture leg, there is less deformation of the parts of the glide caused by wear on the bearing surfaces of the parts. The wear between the outer spherical surface of the ball and the inner cylindrical surface of the socket cavity is thereby reduced to a minimum, thus insuring a better connection between the ball and the top of the socket. This reduction of wear also facilitates the use of cheaper materials in molding the two members. Although the unit saving of a particular glide is relatively small, the accumulated saving in the mass production which is contemplated in manufacturing such furniture glides is quite considerable. In addition, by reducing the thrust between the ball and the socket, less binding occurs between the ball and socket and the permissive manufacturing tolerances of the two members are therefore increased.

The shoe member 18 includes a bottom floor engaging wall 24 and an upstanding cylindrical side wall 26 embracing the socket member 14. The side wall 26 has a reduced neck portion 26a which is snap-fitted in an exterior groove 28 on the socket member 14. The upper portion 30 of the side walls 26 are flared outwardly away from the socket member to confine all the thrust between the two members to the bottom wall 24 of the shoe member. The lower portion of socket 14 has a plurality of slots 32 (FIGURE 5) which form a plurality of flexible fingers 33 which are laterally deflectable to permit the neck portion 26a of the shoe to be snap-fitted over the fingers and lodged in the external groove 28 of the socket member.

The ball member 10 has an annular groove 34 for wedgingly receiving the tubular leg end 12. The annular groove forms a central shank portion 36 which extends into the tubular leg end. The shank has external ribs 36a to permit some flexibility upon insertion into a tubular leg end. The ball is easily molded and the groove 34 obviously can take various configurations to adapt the glide for use with various tubular leg ends having square or irregular shapes, for instance. One embodiment which has proven satisfactory includes several angularly spaced cavities 37 at the bottom of groove 34 having ribs 37a therebetween. The ribs assure proper seat height and angle by assuring proper spacing of the leg end from the floor. The ribs also provide a desired combination of resistance and resilience for transmitting leg end loads to the ball member.

In assembly, the ball member is inserted through the bottom opening 22 in the socket member 14 so that the groove 34 and shank portion 36 face upwardly for receiving a furniture leg. The shoe 24 is then snapped onto the bottom of the socket member 14 to retain the ball within the socket. The assembly may then be installed onto a furniture leg by wedgingly pressing the furniture leg end into the annular groove 34 of the ball member. The mouth 20 of the socket member is sufficiently large to permit the ball 10 to be snapped into the interior cavity of the socket. Thus, an alternate assembly operation may be performed by securing the ball to the furniture leg end and then snapping the ball past mouth 20 of the socket member which may already be assembled with the shoe 18. It can immediately be seen that the entire assembly of the glide and its installation onto the furniture leg is accomplished without employing a single screw or other fastening means, such as glue or clasps.

The form of the invention shown in FIGURE 3 includes a variation of the ball member to adapt the glide for use with furniture legs which are not necessarily tubular. Many furniture legs are either solid, have an end wall integral with the hollow leg, or have a molded metal leg cap 38 (FIGURE 3) fused to the leg end. Because of the metal cap 38, the furniture leg end is slightly enlarged. The ball member 10' (FIGURE 4), of the form of the invention shown in FIGURE 3, has an interior cavity 40 for receiving the slightly enlarged leg end. The cavity has a mouth 42 slightly smaller than the leg cap 38 to permit the leg end and its fused leg cap to snap-fit into the cavity. The ball 10' has resilient fingers 44 about the mouth 42 which facilitate the snap-fit of the furniture leg end and leg cap 38 into the ball. It is to be understood that by using the term resilient fingers, it is not intended to limit such fingers to those shown in FIGS. 3 and 4. The hollow ball 10' may be formed by a plurality of sections comprising the resilient fingers, for instance. The mouth and/or cavity of the ball may be of various configurations to adapt the glide for use with various leg ends having square or irregular outer perimeters. For leg ends which are not provided with an end cap 38, separate end caps may accompany the assembled glide and may be force fitted onto the end of the furniture legs, or the tubular legs may be forcibly spread to provide an enlargement at its end for insertion into the ball cavity. The assembly and installation of this form of the furniture glide is similar to that described above in conjunction with the form shown in FIGURE 1.

The foregoing detailed description is given for clearness of understanding only and no unnecessary limitations are to be understood therefrom, as some modifications will be obvious to those skilled in the art.

I claim:

1. In combination with a furniture leg, a furniture glide, comprising a ball member adapted to be secured to the end of said furniture leg, a socket member embracing the ball member for universal movement to permit tilting of the furniture leg with respect to the socket member, and a floor engaging shoe member secured solely about the bottom of said socket member, the socket member having a bottom opening larger than the lower portion of said ball member and located to permit the ball member to rest on the central portion of said shoe member in assembly of said furniture glide so that thrust from the furniture leg is transmitted directly to the shoe.

2. The combination of claim 1 wherein said furniture leg is tubular and wherein said ball member has an annular groove extending into the interior of the ball member for wedgingly receiving said tubular furniture leg, the annular groove forming a central shank portion which extends into the tubular leg.

3. The combination of claim 1 wherein said furniture leg end has means forming a slightly enlarged portion at its end and wherein said ball member has an interior cavity for receiving said slightly enlarged portion, means forming a mouth portion extending between the cavity and the interior of the ball member, said mouth portion being slightly smaller than said enlarged portion to permit the leg end to snap fit into the cavity.

4. In combination with a furniture leg having a slightly enlarged portion at its end, a furniture glide comprising a ball member having an interior cavity for receiving said slightly enlarged portion at the end of said furniture leg, means forming a mouth portion extending between the cavity and the interior of the ball member, said mouth portion being slightly smaller than said enlarged portion and having resilient fingers about the mouth to permit the leg end to snap fit into the cavity, and a socket member embracing the ball member to provide a universal movement to permit tilting of the furniture leg with respect to the socket member.

5. The combination of claim 4 wherein said enlarged portion of said leg end is comprised of an end cap secured to the leg end.

6. In combination with a furniture leg, a furniture glide, comprising a ball member adapted to be secured to the end of said furniture leg, a socket member embracing the ball member for universal movement to permit tilting of the furniture leg with respect to the socket member, and a floor engaging shoe member secured solely about the bottom of said socket member, the socket member having a bottom opening located to permit the ball member to rest on the central portion of said shoe member in assembly of said furniture glide so that thrust from the furniture leg is transmitted directly to the shoe, the bottom of said socket member having resilient finger means which permit said shoe member to be snap fitted onto said socket.

7. In combination with a furniture leg, a furniture glide, comprising a ball member adapted to be secured to the end of said furniture leg, a socket member embracing the ball member for universal movement to permit tilting of the furniture leg with respect to the socket member, and a floor engaging shoe member secured solely about the bottom of said socket member, the socket member having a bottom opening located to permit the ball member to rest on the central portion of said shoe member in assembly of said furniture glide so that thrust from the furniture leg is transmitted directly to the shoe, said socket member having an exterior groove, said shoe member including a bottom floor engaging wall and upstanding side walls embracing said socket member, the side walls having a reduced neck portion snap fitted in the exterior groove on said socket member, the upper marginal portion of said side walls being flared outwardly away from said socket member to confine any thrust between the socket and the shoe member to the bottom wall of said shoe member.

8. In a ball and socket type furniture glide which includes a ball member secured to a furniture leg end and a socket member embracing the ball member for universal movement to permit tilting of the furniture leg with respect to the socket member, an improved connecting means between the ball member and the furniture leg end wherein the furniture leg end has means forming a slightly enlarged portion at its end and wherein the ball member has means forming an interior cavity for receiving said slightly enlarged portion, means forming a mouth in the ball between said cavity and the exterior of the ball member, said mouth being slightly smaller than said enlarged end and having resilient fingers about said mouth to permit said leg end to snap fit into said cavity.

References Cited

UNITED STATES PATENTS 2,753,586 7/1956 Metz ---------------- 16—43
1,954,848 4/1934 Scott.

BOBBY R. GAY, *Primary Examiner.*

D. L. TROUTMAN, *Assistant Examiner.*